US011881753B2

(12) United States Patent
Stengert

(10) Patent No.: US 11,881,753 B2
(45) Date of Patent: Jan. 23, 2024

(54) HOUSING ASSEMBLY FOR AN ELECTRIC DRIVE OR AN ELECTRIC DRIVE UNIT, MOTOR AND VEHICLE

(71) Applicant: JHEECO E-DRIVE AG, Eschen (LI)

(72) Inventor: Katja Stengert, Lienz (CH)

(73) Assignee: JHEECO E-DRIVE AG, Eschen (LI)

( * ) Notice: Subject to any disclaimer, the term of this patent is extended or adjusted under 35 U.S.C. 154(b) by 480 days.

(21) Appl. No.: 15/734,118

(22) PCT Filed: May 27, 2019

(86) PCT No.: PCT/EP2019/063621
§ 371 (c)(1),
(2) Date: Dec. 1, 2020

(87) PCT Pub. No.: WO2019/228966
PCT Pub. Date: Dec. 5, 2019

(65) Prior Publication Data
US 2021/0218310 A1   Jul. 15, 2021

(30) Foreign Application Priority Data
Jun. 1, 2018  (DE) .................. 10 2018 113 099

(51) Int. Cl.
*H02K 5/04* (2006.01)
*H02K 11/33* (2016.01)
(Continued)

(52) U.S. Cl.
CPC ............ *H02K 5/04* (2013.01); *H02K 5/20* (2013.01); *H02K 9/00* (2013.01); *H02K 11/33* (2016.01)

(58) Field of Classification Search
CPC . H02K 5/20; H02K 11/33; H02K 9/00; H02K 5/04; H02K 11/30; H02K 9/02;
(Continued)

(56) References Cited

U.S. PATENT DOCUMENTS 6,265,840 B1 * 7/2001 Wiezorek ............ B60R 16/0239
                                                                    318/434
2004/0124332 A1    7/2004 Takenaka et al.
(Continued)

FOREIGN PATENT DOCUMENTS

CN      106655977 A       5/2017
DE   102011089076 A1      2/2013
(Continued)

OTHER PUBLICATIONS

De Filippis Pietro, Electrical Machine, Dec. 4, 2014, WO 2014191893 (English Machine Translation) (Year: 2014).*
(Continued)

*Primary Examiner* — Alexander A Singh
(74) *Attorney, Agent, or Firm* — Calfee, Halter & Griswold LLP

(57) ABSTRACT

The invention refers to a housing assembly for an electric drive or an electric drive unit, in particular of a motor vehicle, comprising a housing, a cooling fluid and an inverter, the housing forming a cooling circuit for receiving the cooling fluid with at least one first recess and the inverter having at least one capacitor assembly which is provided for arrangement in the first recess of the housing. The capacitor assembly is formed with at least one capacitor, in particular a wound capacitor, a shell for receiving the capacitor and a thermal conduction element, in particular a thermally conductive resin, for embedding the capacitor in the shell. The capacitor assembly can be coupled directly to the shell. Furthermore, the invention refers to a motor and a vehicle.

9 Claims, 3 Drawing Sheets

(51) Int. Cl.
*H02K 9/00* (2006.01)
*H02K 5/20* (2006.01)

(58) Field of Classification Search
CPC .. H02K 9/04; H02K 9/06; H02K 9/08; H02K 9/10; H02K 9/12; H02K 9/14; H02K 9/16; H02K 9/18; H02K 9/19; H02K 9/193; H02K 9/197
USPC ........... 310/68 R, 52, 53, 54, 55, 57, 58, 59, 310/60 A, 64
See application file for complete search history.

(56) References Cited

U.S. PATENT DOCUMENTS

| | | | |
|---|---|---|---|
| 2016/0056683 A1 | 2/2016 | Nakanishi et al. | |
| 2016/0254719 A1* | 9/2016 | Pondelek | F16H 57/0476 310/54 |
| 2018/0228048 A1* | 8/2018 | Blösch | H05K 5/0217 |
| 2020/0169147 A1* | 5/2020 | Söhnle | H02M 7/003 |

FOREIGN PATENT DOCUMENTS

| | | | |
|---|---|---|---|
| DE | 112008001578 B4 | 10/2016 | |
| DE | 102015219149 A1 | 3/2017 | |
| JP | H05219704 A | 8/1993 | |
| WO | WO-2012013265 A2 * | 2/2012 | ............... H01C 1/08 |
| WO | WO-2014191893 A2 * | 12/2014 | ............. H02K 11/33 |

OTHER PUBLICATIONS

Schiffmann et al, Arrangement for Cooling Electrical Components, Feb. 2, 2012, WO 2012013265 (English Machine Translation) (Year: 2012).*

English Translation of International Search Report from PCT/EP2019/063621 dated Sep. 13, 2019 (3 pages).

* cited by examiner

HOUSING ASSEMBLY FOR AN ELECTRIC DRIVE OR AN ELECTRIC DRIVE UNIT, MOTOR AND VEHICLE

CROSS-REFERENCE TO RELATED APPLICATIONS

This application is a 371 of PCT Application No. PCT/EP2019/063621 filed on May 27, 2019, which claims priority to German Application No. 10 2018 113 099.6 filed on Jun. 1, 2018, the contents of which are hereby incorporated by reference as if recited in their entirety.

The invention refers to a housing assembly for an electric drive or an electric drive unit. Furthermore, the invention refers to a motor and a vehicle.

Heat management in electrical components plays an important role in ensuring the durability of the components. In the case of capacitors, the assurance of functionality depends largely on ensuring that a certain temperature is not exceeded. Even a one-time and temporary exceeding of the permissible core temperature of the capacitor can lead to irreversible damage and thus to the unsuitability of the component or the connected assembly.

Particularly in dynamic applications, inverters for passenger cars or the like are subject to peak loads, e.g. due to overtaking uphill. The hot spot always occurs inside the capacitor. Targeted temperature monitoring is not possible due to the inaccessibility of this hot spot.

Therefore it is essential to accelerate the heat transfer in order to be able operate the capacitors closer to the (continuous) power limit or closer to the temperature limit.

The invention is based on the object of providing a housing assembly for an electric drive or an electric drive unit which is easy to manufacture and maintain, takes up a small installation space and provides an optimized cooling capacity. The invention is further based on the object of providing a motor and a vehicle.

According to the invention, this object is solved with regard to the housing assembly by the subject matter of claim 1. With regard to the motor and the vehicle, the above-mentioned object is solved by the subject matter of the alternative independent claims. Preferred embodiments are indicated in the dependent claims.

The invention is based on the idea, that a housing assembly for an electric drive or an electric drive unit comprises a housing, a cooling fluid and an inverter. The housing forms a cooling circuit for receiving the cooling fluid with at least one first recess and the inverter comprises at least one capacitor assembly, which is provided to be placed in the first recess of the housing. The capacitor assembly is formed with at least one capacitor of a shell for receiving at least one capacitor and one thermal conduction element, in particular a thermally conductive resin, for embedding the at least one capacitor in the shell. The capacitor assembly is directly coupled or can be coupled to the housing.

It is advantageous to use the electric drive as the drive of a motor vehicle. It is advantageous if one or a plurality of the capacitors used is a wound capacitor.

The housing group according to the invention is essentially provided for an electric drive or an electric drive unit and/or for use in a drive unit. The housing group is preferably adapted to accommodate at least one stator in order to be able to serve for providing a drive unit, in particular in the form of an electric motor.

Furthermore, the invention is based on the implementation of a cooling function and the receptacle of the capacitor assembly in the form of an integral construction of the housing assembly. In this way, a reduction of the number of components as well as an optimization of the manufacturing process can be achieved. Likewise, the susceptibility to errors of the housing assembly or the associated drive unit is reduced on the basis of a reduced number of individual components, thus ensuring higher reliability and simplified maintenance.

The capacitor assembly of the inverter is provided with at least one capacitor, in particular a wound capacitor, a shell for receiving the capacitor and a thermal conduction element, in particular a thermally conductive resin, for embedding the capacitor in the shell. In this way, an advantageous heat transfer from the capacitor to the shell of the capacitor assembly can be provided to achieve efficient cooling of the capacitor assembly.

In particular, no additional cladding layer or the like is required to prevent contact between the coolant and the capacitor assembly.

In addition, the capacitor assembly is directly coupled or can be coupled to the housing. In the sense of the present invention, the capacitor assembly as well as the housing of the housing assembly are preferably formed integrally in such a way that the capacitor assembly and the housing can be directly attached to each other or connected to each other. Furthermore, an appropriate positioning and support of the capacitor assembly on the housing, in particular in the first recess of the housing, can be provided.

Preferably, the capacitor assembly can be coupled directly to the housing by means of a material and/or frictional and/or positive connection.

In particular, an adhesive bond can be provided for direct coupling of the capacitor assembly to the housing. In this way a mechanical connection as well as a sealing function can be provided. The adhesive bond can be formed as a detachable or non-destructively detachable adhesive bond or as an undetachable adhesive bond.

For the purposes of the present invention, commercial connecting elements such as screws, clamps, rivets or the like may also be provided to provide the direct, immediate connection between the housing and the capacitor assembly.

In accordance with an embodiment, the shell of the capacitor assembly has a collar with at least one stiffening member, the collar being formed for a direct non-positive and/or material and/or positive connection of the capacitor assembly to the housing.

It is advantageous that the capacitor group can be directly connected to the housing of the housing assembly for an electric drive or electric drive unit. Furthermore, in the event of a fault, the capacitor assembly or the capacitor assembly with connectors can be easily replaced due to the detachable direct connection to the housing.

In the context of the present invention, the direct coupling of the housing with the capacitor assembly can also be understood to mean that the housing, in particular the first recess, and the capacitor assembly are provided to form a non-positive and/or material and/or positive connection, in particular a clamp connection, a snap connection or the like. In this sense, no further connecting elements, such as screws, rivets, adhesives or the like, are necessary to provide the direct connection between the housing and the capacitor assembly in a practical form.

According to a further embodiment, the capacitor assembly is arranged in the first recess of the housing in such a way that the shell is in contact with the cooling fluid on five sides.

This has the advantage that a maximum area of the capacitor assembly can be used for heat transfer to the cooling fluid. Heat dissipation of the capacitor assembly occurs along the bottom of the capacitor assembly as well as through the sides or side surface of the capacitor assembly. Effective heat dissipation from the capacitor assembly to the cooling fluid is enabled.

According to another preferred embodiment, the collar of the shell and the first recess of the housing are formed in such a way that the capacitor assembly is arranged centered and floating in the first recess. The capacitor assembly is centered by the collar in the first recess of the housing.

This provides the advantage that essentially the same volume of cooling fluid is provided along the sides or side faces of the capacitor assembly, so that uniform cooling can be achieved from all sides of the capacitor assembly.

Alternatively, the collar of the shell and the first recess of the housing may be formed such that the capacitor assembly is offset to at least one side and floating in the first recess, especially if there is uneven heat dissipation of the capacitor assembly along the side faces.

According to an embodiment, a sealing unit, especially a sealing ring, is provided between the collar of the shell and the housing. Preferably, the sealing unit can be located in the housing, along the first recess, or in the collar of the shell. In this way, the seal is provided integrally in the capacitor assembly or along the first recess of the housing. When the capacitor assembly is connected to the housing, the cooling circuit or fluid cooling or cooling fluid is in proper contact with the capacitor assembly to be cooled and is properly sealed.

According to a preferred embodiment, the shell of the capacitor assembly is formed as a thin-walled aluminum shell. The shell has minimal heat absorption and improved heat transfer between the at least one capacitor and the cooling fluid. A capacitor assembly with optimized heat dissipation characteristics is provided to cool the at least one capacitor. For high voltage applications in particular, an insulating foil can be used to provide insulation between the electrically conductive aluminum shell and the capacitor windings.

According to another embodiment, the shell of the capacitor assembly can be made of insulating plastic so that the shell acts as an insulator and, in particular, a separate insulating film is not required.

In a further embodiment, at least one flow guiding unit is provided on a bottom of the capacitor assembly, in particular on a bottom of the shell, and/or on a bottom surface of the first recess of the housing. Preferably, this allows an advantageous flow direction of the cooling fluid along the capacitor assembly. In this way the heat transfer from the capacitor assembly to the cooling fluid can be optimized.

According to an embodiment, the flow guiding unit is intended as an insert element for positioning in the first recess of the housing. Due to the exchangeability of the flow guiding unit, the cooling fluid flow along the capacitor assembly can be adapted as required. Especially when replacing the capacitor assembly, the fluid flow can easily be adapted to a different arrangement of the at least one capacitor or a different heat distribution within the capacitor assembly.

In a preferred embodiment, the capacitor assembly has a plurality of capacitors and the flow guiding unit is provided to form at least substantially parallel cooling fluid flows along the individual capacitors. In this way an optimized heat transfer along the capacitor assembly to the cooling fluid is ensured. Furthermore, a pressure loss along the majority of cooling fluid flows can be reduced. This provides efficient cooling of the capacitor assembly.

According to an embodiment the inverter has at least one semiconductor component, where the cooling circuit of the housing is provided with at least a second recess with cooling fluid for cooling the semiconductor component. The cooling circuit with the cooling fluid is further adapted for cooling the housing or a motor interior, in particular at least one winding head of the stator.

Within the meaning of the present invention, the cooling circuit is adapted in such a way that the cooling circuit provides the appropriate cooling of the inverter, in particular with the cooling fluid in the first and second recess of the housing. Furthermore, the form of the cooling circuit can be used to achieve the cooling of the housing, or of a motor interior. For example, if a stator is provided in the motor interior, it can be provided that the at least one winding head of the stator can be cooled or tempered using the cooling circuit. Due to the integral form of the cooling circuit in the housing of the housing assembly, in particular with the first and second recess in the housing, a cooling effect can be provided by the appropriate use of the cooling fluid.

In one embodiment the inverter is formed with at least two semiconductor components and at least two capacitors, wherein the capacitors of the capacitor assembly are each connectable to a first and a second connector. The capacitors can each be connected to one of the semiconductor components via the first connector. Furthermore, the capacitors can be connected to each other via the second connector to form a parallel circuit and/or to a voltage source.

The capacitors and/or first and second connectors and/or the semiconductor components are exchangeable in an advantageous way, especially in case of a fault. Preferably the capacitors, the first and second connectors and the semiconductor components are modularly exchangeable. This provides a simplified assembly and maintenance of the housing assembly according to the invention. Furthermore, a parallel connection of the capacitors as well as a connection of the individual capacitors with a voltage source can be implemented if required.

In a secondary aspect, the present invention refers to a motor, in particular an electric motor, with a housing assembly according to one of the preceding claims.

In particular, it may be provided that the housing assembly according to the invention is formed in conjunction with a stator and a rotor to form an electric motor.

According to another secondary aspect of the invention, a vehicle with a housing assembly in accordance with the invention is provided. Thus, the advantageously formed housing assembly in the sense of the present invention can be provided for an motor within a vehicle as well as in other use for a vehicle, in particular a motor vehicle.

In summary, the housing assembly according to the invention as well as a motor or a vehicle in the sense of the present invention provide an integrally formed receptacle and cooling for an inverter with at least one capacitor in a favorable way.

The invention is explained below with reference to the schematic drawings with further details.

FIG. 1 shows a first embodiment of a housing 12 of a housing assembly 10 according to the invention.

The housing 12 is shown with a first recess 14 and a second recess 16. Furthermore, the housing 12 has a motor interior 18 or an receptacle for at least part of a motor, in particular a stator of an electric motor.

Figure 1:
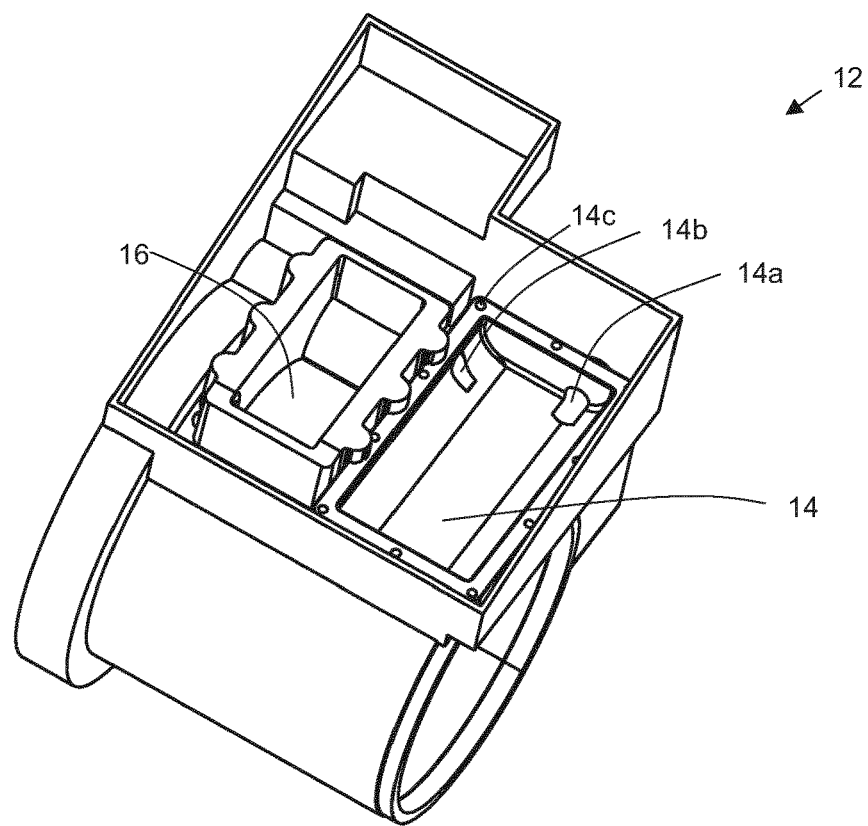
FIG. 1 shows a schematic embodiment of a housing of a housing assembly according to the invention.

The first and second recesses 14; 16 each comprise a rectangular basic shape according to FIG. 1. The first recess 14 is aligned parallel to the second recess 16. Along the edge of the first recess 14, bore for the receptacle 14c of e.g. screws, rivets or the like are symmetrically distributed in circumferential direction.

Furthermore, the first recess 14 is formed on its bottom side in longitudinal direction with rounded inner edges. A first cooling fluid opening 14a and a second cooling fluid opening 14b are provided in the first recess 14 according to FIG. 1, which can be used as cooling fluid inlet and cooling fluid outlet respectively to form a cooling circuit. In particular, the second cooling fluid opening 14b can be provided as a piercing opening between the first recess 14 and the second recess 16 of housing 12.

The first and second recesses 14; 16 are formed according to FIG. 1 on one side, in particular on a top side of housing 12. According to FIG. 1, the motor interior 18 is positioned below the first and second recesses 14; 16 in housing 12.

Figure 2:
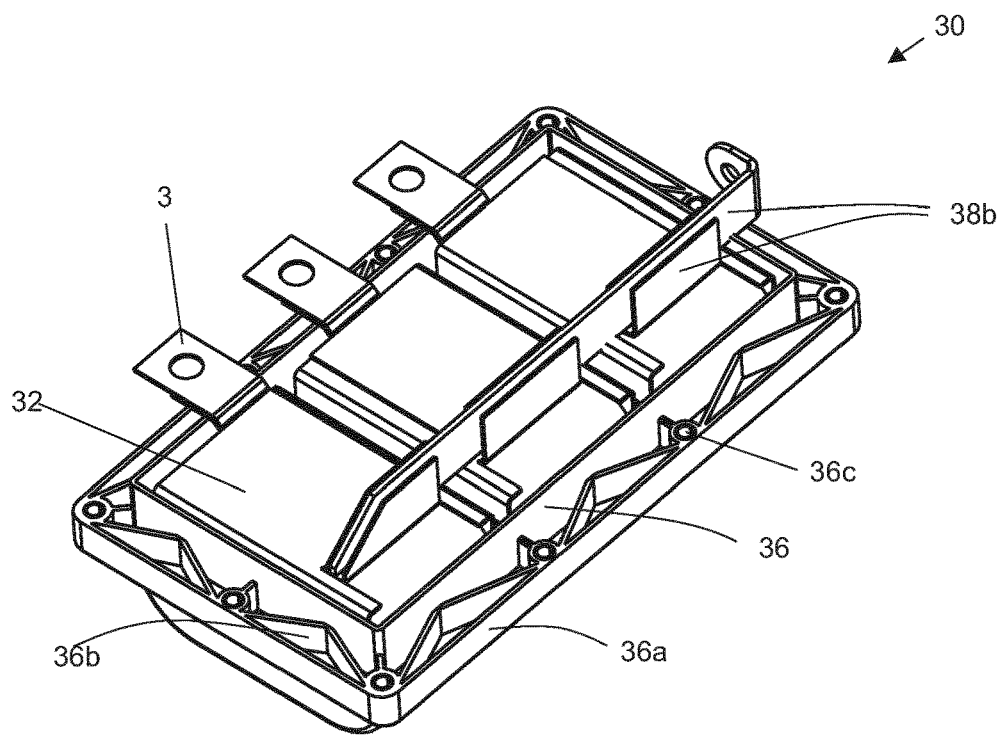
FIG. 2 shows a schematic embodiment of a capacitor assembly of a housing assembly according to the invention.

FIG. 2 shows an embodiment of a capacitor assembly 30 of a housing assembly 10 according to the invention.

According to FIG. 2, capacitor assembly 30 has a total of three capacitors 32. The capacitors 32 are each connected to a first connector 38a. In addition, the three capacitors are interconnected via a second connector 38b, in particular via an electrically conductive connecting rail 38b. Thus, it is possible to connect the three capacitors in parallel as shown in FIG. 2.

According to the schematic diagram in FIG. 2, the capacitors 32 are surrounded by a shell 36, which has a circumferential collar 36a. The collar 36a has a circumferential ring and angularly positioned stiffening elements 36b. In particular, the angularly set stiffening elements 36b run in a serrated pattern between the circumferential ring of the collar 36a and the shell 36, allowing the collar 36a, in particular the circumferential ring of the collar 36a, to rest against the shell 36. The grid-like structure of the circumferential collar 36a allows weight savings while maintaining high stability.

In addition, the collar 36a is shown with a plurality of receptacles 36c for fixing elements such as screws, rivets or similar. The receptacle 36c are symmetrically distributed along the collar 36a. In particular, the receptacles 36c are positioned along the circumferential collar 36a corresponding to the bores 14c of the housing along the first recess 14.

Figure 3:
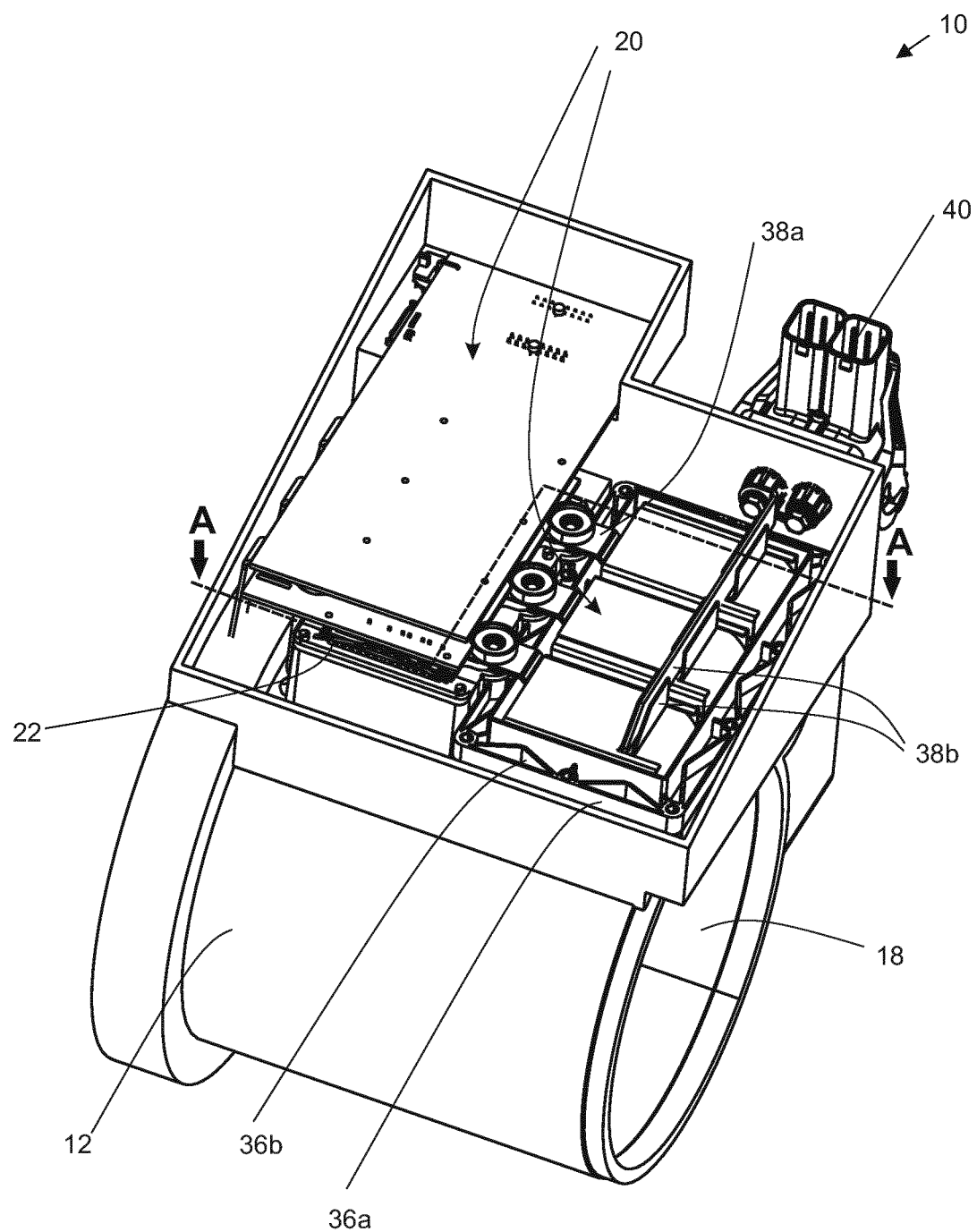
FIG. 3 shows a schematic embodiment of a housing assembly according to the invention with the housing according to FIG. 1 and the capacitor assembly according to FIG. 2.

FIG. 3 shows a schematic embodiment of a housing assembly 10 according to the invention with housing 12 according to FIG. 1 and capacitor assembly 12 according to FIG. 2.

According to FIG. 3, the capacitor assembly 12 with three capacitors 32 is arranged in the first recess 14. At least one semiconductor component 22 of the inverter 20, arranged on a board, is positioned in the second recess 16.

The three capacitors 32 of capacitor assembly 30 are each connected to a first connector 38a. Furthermore, the three capacitors 32 are electrically connected to each other via a second connector 38b and can be connected to a voltage source via a plug socket 40.

The capacitor assembly 30 can be connected to the housing 12 of the housing assembly 10 via the circumferential collar 36a, in conjunction with the shell 36, with a material and/or frictional and/or positive connection to the housing 12. In this way, the capacitor assembly 30 of the inverter 20 can be coupled integrally with the housing 12 and exchanged in a modular fashion.

Figure 4:
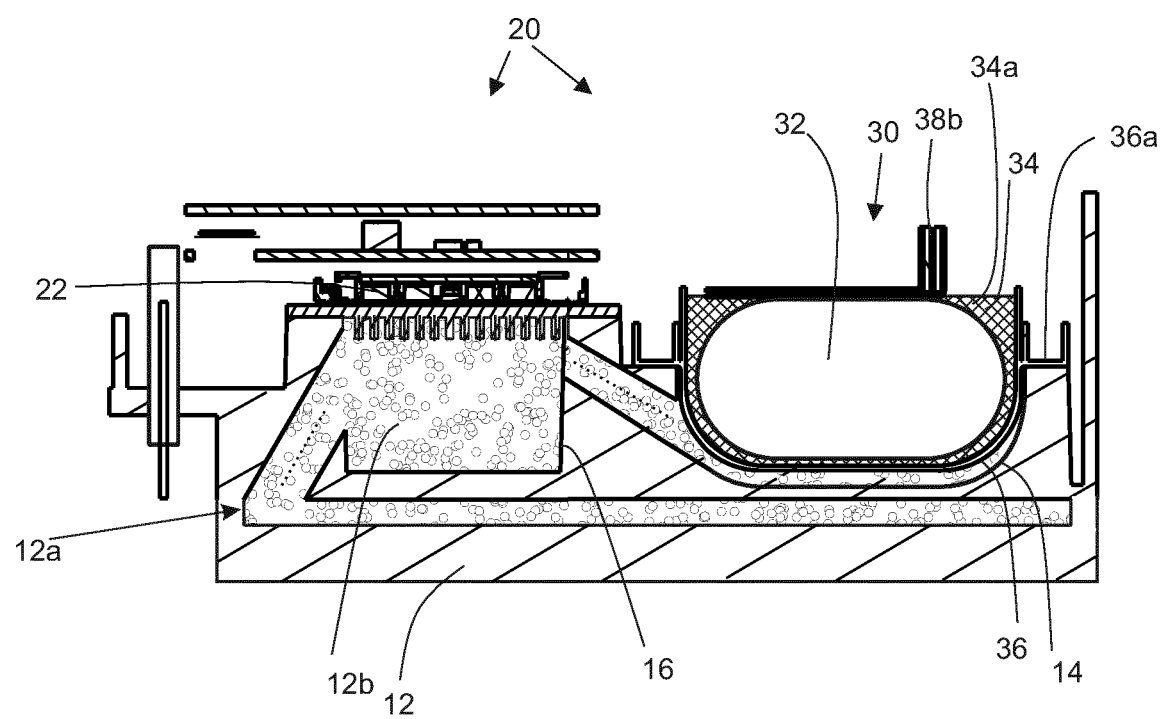
FIG. 4 shows a cross-section A-A of the schematic embodiment of the housing assembly according to FIG. 3.

FIG. 4 shows a cross-section A-A of the schematic embodiment of the housing assembly according to FIG. 3.

The capacitor assembly 30 is shown with capacitors 32, a thermal conduction element 34, especially a thermally conductive resin 34a, the shell 36 and the frame 36a. The capacitors 32 are embedded in the shell 36 by means of the thermally conductive resin 34a. The second connectors 38b are shown for electrical connection of the capacitors 32. The first connectors 38a are not visible in FIG. 4.

The capacitor assembly 30 is connected to the housing 12 via the collar 36a, with circumferential ring and stiffening elements 36b (not shown in FIG. 4). Thus, FIG. 4 shows the central or centered and floating arrangement of the capacitor assembly 30 in the first recess 14 of the housing 12. The capacitor assembly 30, in particular the shell 36, is preferably evenly surrounded along the sides by cooling fluid 12b.

In the second recess 16 of the housing 12 the at least one semiconductor component 22 of the inverter 20 is arranged in contact with the cooling fluid 12b. Especially the at least one semiconductor component 22 is shown positioned on a board. From the semiconductor component 22, heat can be transferred to the cooling fluid 12b in the second recess 16.

Furthermore, FIG. 4 shows the integral configuration of the cooling circuit 12a. In particular, the cooling circuit 12a connects the first and second recesses 14; 16 with each other in such a way that cooling fluid can pass between the two recesses 14; 16. Furthermore, the cooling circuit 12a has further flow paths so that, for example, the housing 12 can be cooled by means of the cooling fluid 12b.

In summary, an integrally formed cooling circuit for the cooling of a capacitor assembly 30 in particular and an integrally formed receptacle for the capacitor assembly 30 can be provided using the housing assembly 10 according to the invention. An optimized, efficient cooling for the capacitor assembly 30 of the inverter 20 can be provided in an advantageous way using the housing assembly 10 according to the invention, in particular for an electric drive and/or an electric drive unit.

REFERENCE NUMERAL LIST 10 housing assembly
12 housing
12a cooling circuit
12b cooling fluid
14 first recess
16 second recess
18 motor interior
20 inverter
22 semiconductor components
30 capacitor assembly
32 capacitor
34 thermal conduction element
34 thermally conductive resin
36 shell
36a circumferential collar
36b stiffening element
38 first connector
38b second connector
40 plug socket

The invention claimed is:

1. Housing assembly for an electric drive or an electric drive unit comprising a housing, a cooling fluid and an inverter, wherein the housing forms a cooling circuit for receiving the cooling fluid with at least one first recess and the inverter comprises at least one capacitor assembly which is provided for arrangement in the first recess of the housing, wherein the capacitor assembly is formed with at least one capacitor, a shell for receiving at least one capacitor and a thermal conduction element, for embedding the at least one capacitor in the shell, and wherein the capacitor assembly can be coupled directly to the housing, and wherein the shell of the capacitor assembly has a collar with at least one stiffening element, wherein the collar is adapted for a direct non-positive and/or material and/or positive connection of the capacitor assembly to the housing, wherein the capacitor assembly is arranged in the first recess of the housing such that the shell is in contact with the cooling fluid on five sides.

2. Housing assembly according to claim 1, wherein the thermal conduction element is formed by a thermally conductive resin.

3. Housing assembly according to claim 1, wherein the collar of the shell and the first recess of the housing are configured such that the capacitor assembly is arranged centrally and suspended in the first recess.

4. Housing assembly according to claim 1, wherein a sealing unit is provided between the collar of the shell and the housing.

5. Housing assembly according to claim 1, wherein the shell of the capacitor assembly is formed as a thin-walled aluminum shell or plastic shell.

6. Housing assembly according to claim 1, wherein the inverter has at least one semiconductor component, the cooling circuit of the housing being provided with at least one second recess with cooling fluid for cooling the semiconductor component, and the cooling circuit with the cooling fluid also being adapted for cooling the housing or a motor interior.

7. Housing assembly according to claim 6, wherein the inverter is formed with at least two semiconductor components and at least two capacitors, the capacitors of the capacitor assembly each having a first and a second connector, wherein the capacitors can be connected via the first connector to one of the semiconductor components each, and wherein the capacitors can be connected via the second connector to each other, to form a parallel circuit, and/or to a voltage source.

8. Motor, in particular electric motor, with a housing assembly according to claim 1.

9. Vehicle with a housing assembly according to claim 1.

* * * * *